United States Patent [19]

Exner et al.

[11] Patent Number: 4,959,519

[45] Date of Patent: Sep. 25, 1990

[54] CONTROLLED PRESSURE BUTT WELDING PROCESS AND APPARATUS FOR CARRYING IT OUT

[75] Inventors: Karl-Christoph Exner; Franz Reichow; Horst Becker, all of Köln, Fed. Rep. of Germany

[73] Assignee: Meyer, Roth & Pastor Maschinenfabrik GmbH

[21] Appl. No.: 315,418

[22] Filed: Feb. 23, 1989

[30] Foreign Application Priority Data

Feb. 27, 1988 [DE] Fed. Rep. of Germany ....... 3806246

[51] Int. Cl.$^5$ .............................................. B23K 11/02
[52] U.S. Cl. ....................................... 219/110; 219/51
[58] Field of Search .................................. 219/110, 51

[56] References Cited

U.S. PATENT DOCUMENTS

| | | | |
|---|---|---|---|
| 2,684,422 | 7/1954 | Esser et al. | 219/51 |
| 4,025,451 | 2/1978 | Wust | 219/51 |
| 4,419,558 | 12/1983 | Stiebel . | |

FOREIGN PATENT DOCUMENTS

| | | | |
|---|---|---|---|
| 1540943 | 8/1970 | Fed. Rep. of Germany | 219/51 |
| 2222869 | 11/1973 | Fed. Rep. of Germany . | |
| 2457180 | 6/1976 | Fed. Rep. of Germany . | |
| 1460365 | 1/1977 | United Kingdom . | |
| 1527640 | 10/1978 | United Kingdom . | |

Primary Examiner—Clifford C. Shaw
Attorney, Agent, or Firm—Toren, McGeady & Associates

[57] ABSTRACT

In a pressure butt welding process, in particular for welding chain link bent from round wire, the influence of disturbing factors on the quality of the welding result is compensated by measuring the welding forces $F_K$ exerted on the workpiece by the upsetting dies and setting and welding voltage applied to the workpiece according to the level of the measured forces $F_K$. A control means adjusts the welding voltage via a thyristor control circuit and thereby the effective welding power in such a way that the welding forces $F_K$ remain constant.

7 Claims, 2 Drawing Sheets

CONTROLLED PRESSURE BUTT WELDING PROCESS AND APPARATUS FOR CARRYING IT OUT

TECHNICAL FIELD OF THE INVENTION

The invention relates to a pressure butt welding process, in particular for welding chain links bent from round wire.

BACKGROUND OF THE INVENTION AND PRIOR ART

In all pressure butt welding processes high and consistent welding quality is required. This is particularly the case in the manufacture of chains as even a single badly welded chain link impairs the safety of the whole chain.

In conventional pressure butt welding machines the welding process, comprising in succession a heating and an upsetting phase, is controlled both kinematically and electrically by means of a central control shaft. Arranged on this control shaft are one or more cam discs whose outer contours control the operating sequence of the welding program. Thus, in the case of chain welding machines the advancing of the electrodes and of the upsetting dies or steels applying the longitudinal forces is generally controlled by a spring-loaded lever rolling over a cam disc, in combination with a planar gear. Synchronous therewith a further cam actuates the contacts switching the welding voltage on and off as the control shaft rotates.

This rigid control system has the serious disadvantage that there is no way of compensating for disturbing factors that adversely affect the quality of the welding. Such disturbing factors can include fluctuations in the power-supply voltage, variation in the impedance of the welding transformer as it heats up which, owing to the resulting change in the phase shift between the welding current and the welding voltage, results in changes in effective welding power, and the contact resistances between the welding electrodes and the workpiece which change from time to time. Other specific disturbing factors that impair the quality are those determined by the workpiece, for example the shape and material tolerances of the bent chain links. The last-mentioned condition has until now been countered by making very high demands on the bent chain links with regard to dimensional accuracy and constancy of the standards of quality of the material, which naturally make the production of such chains much more expensive.

OBJECT OF THE INVENTION

It is therefore the object of the invention to provide a control means by which the influence of said disturbing factors can be eliminated reliably.

SUMMARY OF THE INVENTION

To this end, according to the invention, in a process of the kind described in the introduction the forces exerted on the workpiece in its longitudinal direction are measured and the welding voltage applied to the workpiece is adjusted depending on the measured forces. In the case of chain welding machines these longitudinal forces are applied by the so-called upsetting dies or steels and can be measured on these.

The advantage of the procedure according to the invention is that the actual course of the welding is determined by measuring methods, and that owing to the indirect dependence of the welding forces on the effective welding power and thus on the welding voltage, there is a closed control circuit. Thus if the effective welding power introduced into the welding gap should increase, for example under the influence of external disturbing factors, the temperature of the workpiece increases and thus the strength of the material is decreased, which leads to a decrease in the forces measured on the upsetting dies. Owing to the lower measured forces the welding voltage and thus the actual welding performance is reduced by a control means, thereby compensating for the effect of the disturbing factor. Similarly a decrease in the effective welding power leads to an increase in the forces measured in the upsetting dies, which is compensated by an increase in the welding voltage.

Advantageously the welding voltage is only applied to the workpiece when the measured forces exceed a preset threshold value. This threshold can be the lower boundary of a control region. When the measured welding forces approach the force set point lying approximately in the middle of the control region the control means adjusts the welding voltage continuously from 0 to the value necessary for the balance of forces between the chain link and upsetting die.

By this means differences in the lengths of the bent chain links can be compensated. If, for example, a chain link has become too long the upsetting dies touch the ends of the chain link correspondingly earlier during the advance and since the welding forces exceed the threshold value earlier the welding process is started earlier. If a chain link has become too short the welding process begins correspondingly later.

It is a common feature of all pressure butt welding processes that after the end of a specific heating-up period the heated material is upset at the weld joint by moving the upsetting dies further towards one another. As already explained above, in the case of conventional pressure butt welding machines the electric and kinematic course of the process is controlled by a central control shaft. Since in the process according to the invention there are phase differences between the electric and kinematic courses it is advisable to initiate the upsetting phase after the end of the heating-up period, independently of the position of the control shaft at that moment. For this purpose the heating-up period is measured by an electronic clock or the like which, for example, is started when the welding voltage exceeds a specific value for the first time.

Initiation of the upsetting phase is effected kinematically according to the invention after the heating-up period has finished in that an electromagnet rotates a cam disc having a radius that changes sharply at one point on its circumference through a specific angle so that a spring-loaded limb rubbing on the outer contour changes its position abruptly and loads the upsetting dies with the additional upsetting force. After completion of the welding process, i.e. when the upsetting dies return to their starting positions, this cam disc is rotated back to its starting position.

BRIEF DESCRIPTION OF THE DRAWINGS

The invention will now be described in more detail will reference to an exemplary embodiment shown in the drawings. In the drawings.

DETAILED DESCRIPTION OF A PREFERRED EMBODIMENT OF THE INVENTION

Figure 1:
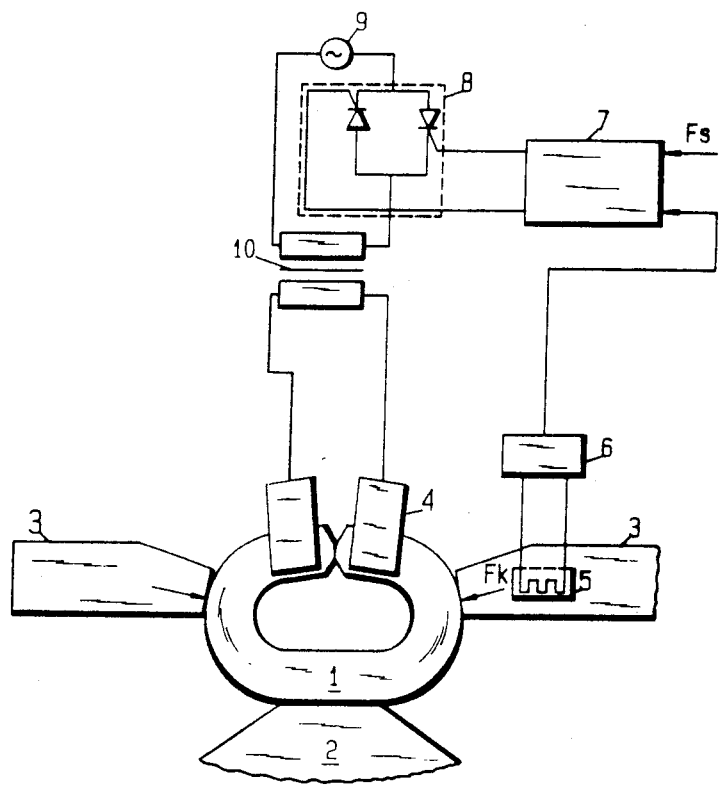
FIG. 1 shows a diagrammatic view of the electrical part.

The chain link 1 lying on the saddle 2 is inserted between two upsetting dies 3 and has the welding voltage applied to it via electrodes 4. By means of a strain gauge 5 the forces $F_K$ exerted by the upsetting dies 3 on the chain link 1 are measured and transmitted in the form of an electrical signal to a measuring amplifier 6. A controller 7 compares the signal supplied by the measuring amplifier 6 with an intended value $F_S$ and sends control signals to a thyristor control circuit 8. The voltage supplied from an alternating-current voltage source 9 is transformed to the welding voltage by a welding transformer 10. The controller 7 controls, via the thyristor control circuit 8, the effective value of the welding voltage by the phase angle control process; in the exemplary embodiment shown in the drawing one phase is shown for clarity. If the measured force deviates upwards from the preselected intended value the duration of the control pulse is prolonged, and vice versa.

Figure 2:
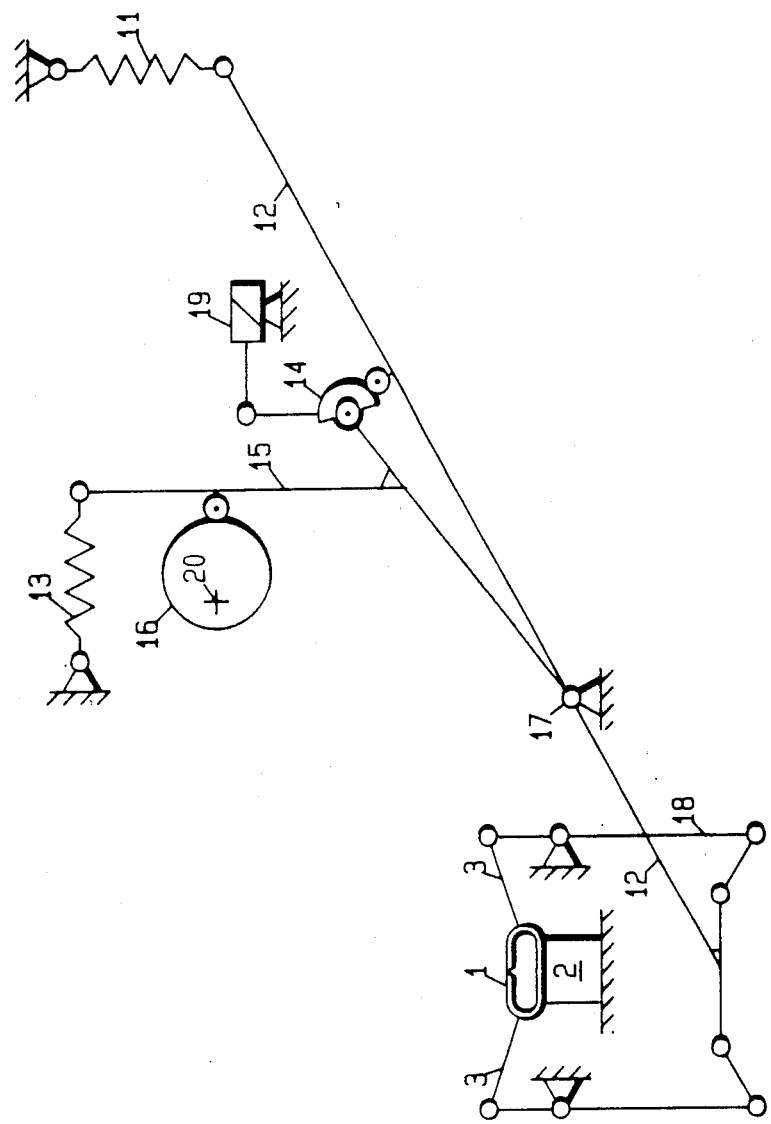
FIG. 2 shows a diagrammatic view of the kinematic part of a pressure butt welding machine operating according to the process of the invention.

The mechanical construction of the device according to the invention is shown in FIG. 2. The device comprises the saddle 2, two upsetting dies 3, two tension springs 11 and 13, two levers 12 and 15 rotatably mounted in a bearing 17, two cam discs 14 and 16, an electromagnet 19, a control shaft 20 shown perpendicular to the plane of the drawing and a lever system 18.

The kinematic course of the process according to the invention will now be described with reference to FIG. 2.

The spring 11 pulls the lever 12 which, supported by the spring 13, pushes the lever 15 via the cam disc 14 against the cam disc 16 seated on the control shaft 20. When the cam disc 16 begins to rotate, the spring 11 pulls the lever 12 further upwards. The lever rotates in its bearing 17 and, by way of the lever system 18, moves the upsetting dies 3 which press the chain link 1 together. A longitudinal force thereby builds up in the chain link 1 which is measured in the upsetting dies. After a threshold value is exceeded the welding process is started. After the end of the preselected heating-up period the electromagnet 19 moves the cam disc 14 from its large radius to its small radius. The lever 12 is abruptly pulled by the spring 11 and by means of the lever system 18 the upsetting dies 3 are suddenly moved, and the welding zone of the chain link 1 is thereby abruptly upset.

At the end of the forward movement of the upsetting dies 3 the deformation at the weld joint is completed. The welding current is switched off. With further rotation of the cam disc 16 the whole lever system 18 moves back into its starting position, and the cam disc 14 is returned from its small radius to its large radius.

What is claimed is:

1. A pressure butt welding process for welding chain links bent from round wire, comprising the steps of:
   pressing together areas of a workpiece to be welded with upsetting dies which are moved in a controlled manner by continuous cam disks;
   measuring pressure forces exerted on the workpiece areas by the upsetting dies;
   applying a welding voltage to the workpiece; and
   continuously adjusting the welding voltage as a function of the measured pressure forces.

2. A process according to claim 1, wherein the welding voltage is an alternating-current voltage, the adjusting step including adjusting the welding voltage depending on the measured pressure forces according to a phase angle control principle.

3. A process according to claim 1, wherein the welding voltage applying step includes applying the welding voltage to the workpiece only when the measured pressure forces exceed a threshold value.

4. A process according to claim 3, wherein the welding voltage applying step includes a preset heating-up period, the pressing together step starting after the end of the preset heating-up period.

5. A process according to claim 3, wherein the welding voltage applying step includes a preset heating-up period, the pressing together step starting after the end of the preset heating-up period.

6. A process according to claim 1, wherein the welding voltage adjusting step includes adjusting the welding voltage by control means so that the pressure forces exerted on the workpiece in its longitudinal direction are kept constant at an intended value.

7. An apparatus for butt welding of chain links bent from round wire, comprising:
   means for pressing together areas of a workpiece to be welded, said pressing means including a transmission formed of a plurality of levers and driven by a control shaft via a first cam disc, at least two members provided so as to be movable by said transmission so as to apply longitudinal forces to a workpiece, a driven second cam disc having a radius which changes abruptly at a point on its circumference, and a spring loaded lever arranged so as to rest on the circumference of the driven second cam disc;
   means for measuring pressure forces exerted on the workpiece areas by said pressing means;
   means for applying a welding voltage to the workpiece when the measured pressure forces exceed a threshold value, said voltage applying means providing a preset heating-up period after which said pressing means presses together the workpiece areas to be welded; and
   means for continuously adjusting the welding voltage as a function of the measured pressure forces.

* * * * *

UNITED STATES PATENT AND TRADEMARK OFFICE
CERTIFICATE OF CORRECTION

PATENT NO. : 4,959,519

DATED : September 25, 1990

INVENTOR(S) : Karl-Christoph Exner, Franz Reichow and Horst Becker

It is certified that error appears in the above-identified patent and that said Letters Patent is hereby corrected as shown below: Title page;

[56]         References Cited

U.S. Patent Documents should read as follows:

2,684,422   7/1954   Esser et al .............. 219/51
4,075,451   2/1978   Wust .................... 219/51
4,419,558   12/1983  Stiebel .................

Signed and Sealed this

Twenty-eighth Day of April, 1992

Attest:

HARRY F. MANBECK, JR.

*Attesting Officer*            *Commissioner of Patents and Trademarks*